US008649489B2

(12) United States Patent
Mornhineway et al.

(10) Patent No.: US 8,649,489 B2
(45) Date of Patent: Feb. 11, 2014

(54) METHOD AND APPARATUS FOR IMPROVING IDENTIFICATION OF A PARTY IN A COMMUNICATION TRANSACTION (75) Inventors: David Mornhineway, San Antonio, TX (US); Edward Walter, Boerne, TX (US); Anup D. Karnalkar, Allen, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1891 days.

(21) Appl. No.: 11/549,424

(22) Filed: Oct. 13, 2006

(65) Prior Publication Data

US 2008/0088700 A1 Apr. 17, 2008

(51) Int. Cl.
*H04M 15/06* (2006.01)

(52) U.S. Cl.
USPC ............... 379/142.06; 379/111; 379/133

(58) Field of Classification Search
USPC ........ 455/566, 567, 412.1–420, 426.1, 426.2, 455/456.1–466, 550.1–560, 575.1–575.9, 455/90.1–90.3; 379/88.16, 88.2, 88.21, 379/88.23, 88.25, 142.01–142.18; 709/201–207, 217–248; 348/14.01–14.16; 370/259–271, 370/351–357
See application file for complete search history.

(56) References Cited

U.S. PATENT DOCUMENTS

| | | | | |
|---|---|---|---|---|
| 5,907,604 A * | 5/1999 | Hsu | ................. | 379/142.06 |
| 5,923,327 A * | 7/1999 | Smith et al. | ................. | 715/784 |
| 6,226,367 B1 * | 5/2001 | Smith et al. | ................. | 379/142.04 |
| 6,377,664 B2 * | 4/2002 | Gerszberg et al. | ......... | 379/88.13 |
| 6,987,845 B1 * | 1/2006 | Van Natter et al. | ........... | 379/126 |
| 7,155,211 B2 * | 12/2006 | Mun et al. | ..................... | 455/415 |
| 7,184,527 B1 * | 2/2007 | Lin et al. | ..................... | 379/93.17 |
| 7,260,419 B2 * | 8/2007 | Lee | ................. | 455/566 |
| 7,404,001 B2 * | 7/2008 | Campbell et al. | ............. | 709/231 |
| 7,409,050 B1 * | 8/2008 | Li et al. | ..................... | 379/142.01 |
| 7,502,450 B2 * | 3/2009 | Sakai et al. | ................. | 379/93.35 |
| 7,738,637 B2 * | 6/2010 | Schmandt et al. | ......... | 379/88.17 |
| 7,778,399 B2 * | 8/2010 | Ambrose | ................. | 379/142.01 |
| 7,856,257 B2 * | 12/2010 | Haru et al. | ................. | 455/575.3 |
| 2003/0012353 A1 | 1/2003 | Tang et al. | | |
| 2003/0063730 A1 * | 4/2003 | Woodring | ................. | 379/207.15 |
| 2004/0102225 A1 * | 5/2004 | Furuta et al. | ................. | 455/566 |
| 2004/0156491 A1 | 8/2004 | Reding et al. | | |
| 2005/0105705 A1 * | 5/2005 | Elcock et al. | ............. | 379/142.01 |
| 2005/0157864 A1 * | 7/2005 | Barclay et al. | ........... | 379/215.01 |
| 2005/0165935 A1 * | 7/2005 | Moody et al. | ................. | 709/228 |
| 2005/0287997 A1 * | 12/2005 | Fournier | ....................... | 455/415 |
| 2006/0025112 A1 * | 2/2006 | Hamanaga et al. | ........ | 455/412.1 |

(Continued)

FOREIGN PATENT DOCUMENTS

| | | | |
|---|---|---|---|
| EP | 1014653 A2 | 6/2000 | |
| EP | 1282319 | 2/2003 | |

(Continued)

*Primary Examiner* — Hemant Patel (74) *Attorney, Agent, or Firm* — Parks IP Law LLC; Jennifer P. Medlin, Esq.

(57) ABSTRACT

A method and apparatus for improving identification of a party in a communication transaction is disclosed. An apparatus that incorporates teachings of the present disclosure may include, for example, a terminal device having a User Interface (UI) element that presents an image identifier that identifies one among a calling party in at least one among an unanswered call and a voicemail message, and a called party in a dialed call. Additional embodiments are disclosed.

23 Claims, 4 Drawing Sheets

(56) References Cited

U.S. PATENT DOCUMENTS

| | | | |
|---|---|---|---|
| 2006/0159236 A1* | 7/2006 | Al-Samadi | 379/67.1 |
| 2006/0171524 A1* | 8/2006 | Tsuchiya et al. | 379/355.01 |
| 2006/0253787 A1* | 11/2006 | Fogg | 715/752 |
| 2006/0258388 A1* | 11/2006 | Sato | 455/550.1 |
| 2007/0202925 A1* | 8/2007 | Beith | 455/567 |
| 2007/0280457 A1* | 12/2007 | Aberethy et al. | 379/201.01 |
| 2007/0293206 A1* | 12/2007 | Lund | 455/415 |
| 2010/0105437 A1* | 4/2010 | Lee et al. | 455/566 |
| 2010/0248703 A1* | 9/2010 | Mears et al. | 455/415 |

FOREIGN PATENT DOCUMENTS

| | | |
|---|---|---|
| EP | 1505814 | 2/2005 |
| JP | 11041339 | 2/1999 |
| WO | 2005050954 | 6/2005 |

\* cited by examiner

METHOD AND APPARATUS FOR IMPROVING IDENTIFICATION OF A PARTY IN A COMMUNICATION TRANSACTION

FIELD OF THE DISCLOSURE

The present disclosure relates generally to identification techniques and more specifically to a method and apparatus for improving identification of a party in a communication transaction.

BACKGROUND

In telecommunication transactions, it is common to identify a calling party with a caller ID that provides the called party's name and/or telephone number. At times when the calling party's name is not supplied the called party may not readily recognize the calling number without reference to a contact book. To alleviate this situation, some communication devices search a contact book for a match to the calling number and when a match is found retrieve and present the caller's name along with the calling number. In cases where the contact book has a picture identification of the calling party, said devices present the picture ID during the incoming call. After the call is answered, the picture ID is no longer used.

For calls that go unanswered, the communication device resorts to creating a call log of received calls accompanied with a voicemail message if one is recorded by the calling party. Call logs are also created for dialed calls made by the user of the communication device. Thus a call log can include a log of missed calls with or without a voicemail, answered calls, and dialed calls. The foregoing call log entries typically show a phone number and/or party name if available.

Although the aforementioned prior art solutions have been helpful, a need arises for a method and apparatus that improves identification of a party in a communication transaction.

DETAILED DESCRIPTION

Embodiments in accordance with the present disclosure provide a method and apparatus for improving identification of a party in a communication transaction.

In a first embodiment of the present disclosure, a computer-readable storage medium in a terminal device can have computer instructions for presenting an image identifier in a call log that identifies one among a calling party and a called party.

In a second embodiment of the present disclosure, a terminal device can have a User Interface (UI) element that presents an image identifier that identifies one among a calling party in at least one among an unanswered call and a voicemail message, and a called party in a dialed call.

In a third embodiment of the present disclosure, a method can have the step of presenting an image identifier retrieved from a voice-only incoming call initiated by a calling party for identifying said calling party.

In a fourth embodiment of the present disclosure, a memory can have an image identifier associated with a call log that identifies one among a calling party and a called party.

Figure 1:
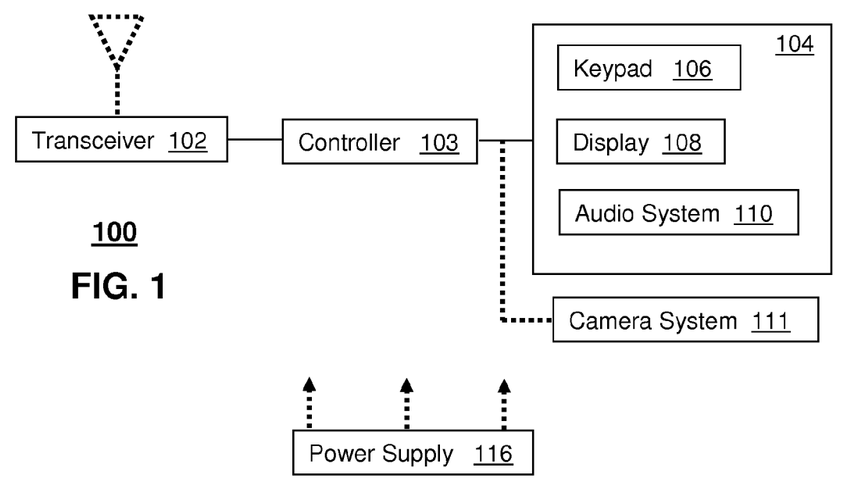
FIG. 1 depicts an exemplary embodiment of a terminal device.

FIG. 1 depicts an exemplary embodiment of a terminal device 100. The terminal device 100 can comprise a wireless or wireline transceiver 102, a user interface (UI) 104, a power supply 116, and a controller 103 for managing operations of the foregoing components. The transceiver 102 can utilize common communication technologies to support singly or in combination any number of wireline access technologies such as cable, xDSL, Public Switched Telephone Network (PSTN), and so on.

Singly or in combination with the wireline technology, the transceiver 102 can support singly or in combination any number of wireless access technologies including without limitation Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing public and private communication spectrum with any number of communication protocols that can be dynamically downloaded over-the-air to the terminal device 100. It should be noted also that next generation wireline and wireless access technologies can also be applied to the present disclosure.

The UI element 104 can include a keypad 106 with depressible or touch sensitive keys and a navigation element such as a navigation disk, button, roller ball, or flywheel for manipulating operations of the terminal device 100. The UI element 104 can further include a display 108 such as monochrome or color LCD (Liquid Crystal Display) which can be touch sensitive for manipulating operations of the terminal device 100 and for conveying images to the end user of said device, and an audio system 110 that utilizes common audio technology for conveying and intercepting audible signals of the end user.

The power supply 116 can utilize common power management technologies such as replaceable batteries, supply regulation technologies, and charging system technologies for supplying energy to the components of the terminal device 100 and to facilitate portable applications. Depending on the type of power supply 116 used, the terminal device 100 can represent an immobile or portable communication device. The controller 103 can utilize computing technologies such as a microprocessor and/or digital signal processor (DSP) with associated storage memory such a Flash, ROM, RAM, SRAM, DRAM or other like technologies for controlling operations of the terminal device 100.

The terminal device 100 can further represent a single operational device or a family of devices configured in a master-slave arrangement. In the latter embodiment, the components of the terminal device 100 can be reused in different form factors for the master and slave terminal devices.

Figure 2:
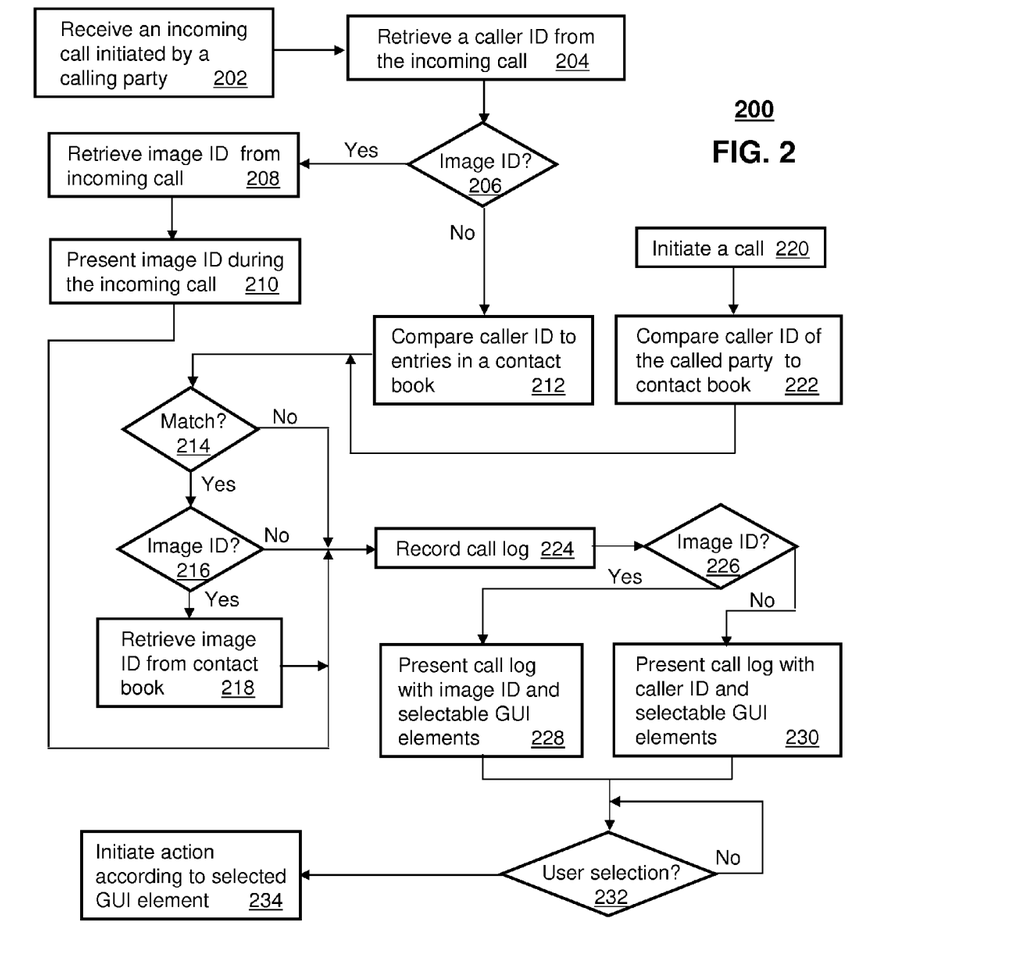
FIG. 2 depicts an exemplary method operating in the terminal device.

FIG. 2 depicts an exemplary embodiment of a method 200 operating in the terminal device 100. Method 200 begins with step 202 in which the terminal device 100 is programmed to detect and receive an incoming call initiated by a calling party. In step 204, the terminal device 100 retrieves a caller ID from the incoming call. The caller ID can represent an Automatic Number Identification (ANI) in a common circuit-switched communication transaction. Alternatively, the caller ID can be retrieved in a packet-switched communication transaction conforming to a Session Initiation Protocol (SIP) signaling message or a tElephone NUmber Mapping (ENUM) standard. ENUM is a Domain Name System (DNS)-based protocol. It provides a user with a domain name on an E.164 server in order to associate a telephone number with a Uniform Resource Identifier (URI) and other DNS-related services. Other suitable present and future caller ID methods can be applied to the present disclosure.

In step 206 the terminal device 100 can be programmed to determine if an image identifier (ID) has been sent with the incoming call. The image ID serves to identify the calling party. The image ID can comprise a still image (JPEG, GIF, or otherwise) or moving image (e.g., MPEG 4, AVI, or otherwise) with or without audio. The image can be of human figure (e.g., an image of the calling party), animated cartoons, scenery, or any other suitable image. The image ID can originate from a communication device of the calling party over, for example, an IP protocol such as SIP or H.323, or any other suitable signaling standard.

In the event that an image ID is detected in step 206, the terminal device 100 proceeds to step 208 where it retrieves the image ID from the incoming call utilizing common protocol processing techniques. In step 210, the terminal device 100 presents the image ID on the display 108 of the terminal device 100 during the incoming call to provide the end user of the terminal device a means to identify the calling party. From step 210, the terminal device proceeds to step 224 to record a call log associated with the answered call. In step 210, the terminal device 100 records the caller ID and the image ID in a received calls section of the call log for later presentation to the end user when navigating through said call log.

Referring back to step 206, if the terminal device 100 detects no image ID with the incoming call, the terminal device proceeds to step 212 where it compares the caller ID to entries in a contact book. The contact book can commonly store entries of parties of interest to the end user of the terminal device. The entries in the contact book can include the name of the party associated with the entry, an image ID, phone numbers, ENUM identification numbers, email addresses, correspondence addresses, and other information associated with the named party. The image ID can be created by downloading an image file to the terminal device 100 from a computing device or wirelessly from a communication source. Alternatively, the image ID can be created from a common camera system 111 of the terminal device that can record still or moving images of a person or object that may help remind the end user of a named party in the contact book.

Upon comparing and detecting in step 214 a matched entry in the contact book with the caller ID, the terminal device proceeds to step 216 where it checks for the availability of an image ID in said entry. If one is found, the terminal device proceeds to step 218 where it retrieves the image ID and associates it to the call log entry recorded in step 224. If neither a match or image ID is found, the terminal device proceeds to step 224 where it records the call log entry without an image ID association.

The above steps can be similarly applied to the end user of the terminal device 100 initiating a call to a targeted party. Upon dialing a phone number or ENUM entry (herein referred to as a caller ID), the terminal device 100 proceeds to step 222 where it compares the caller ID of the called party to the contact book. From step 222, the terminal device 100 proceeds to steps 214-218 to determine if an image ID is available for association with the call log entry corresponding to the dialed call. If an image ID is available, the terminal device 100 associates said entry to the call log entry of the dialed call; otherwise, only the called party's number is presented in the call log.

Once the call log has been generated in step 224 for either an incoming or outgoing call, the terminal device 100 proceeds to step 226 where it checks for the association of an image ID with the call log entry just recorded. If one is available it is presented the image ID with selectable Graphical User Interface (GUI) elements in step 228. The selectable GUI elements can comprise, for example, a contact book icon, a voicemail icon, a call back icon, a memo icon, and/or a delete icon. If in step 226 no image ID is available for the recorded call log entry, then the terminal device 100 presents in step 230 the call log entry with only its caller ID (e.g., caller's or called number) if available with similar GUI elements.

Figure 3:
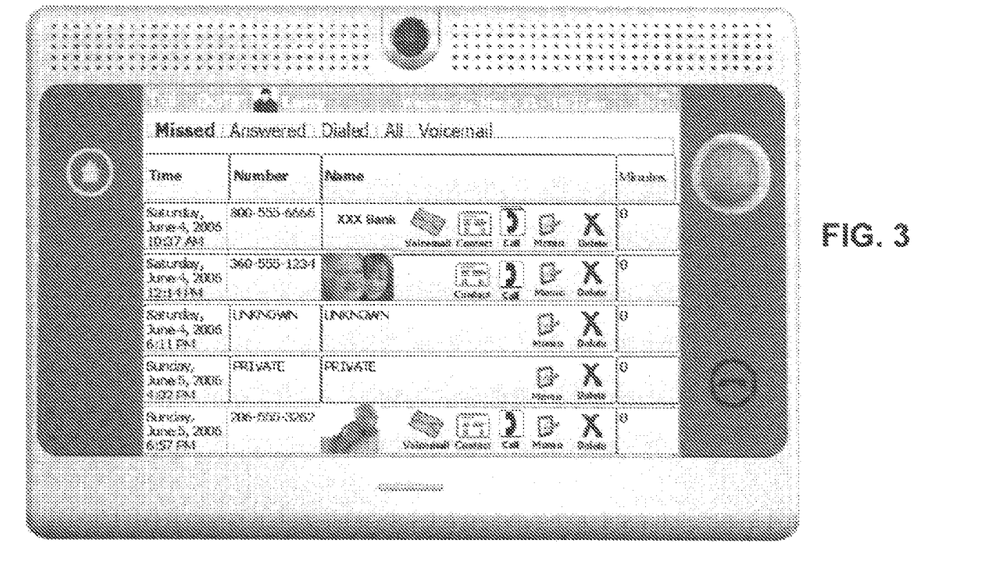
FIGS. 3-4 depict exemplary embodiments of the terminal device for abstracting Internet content.

An illustration of the aforementioned GUI elements and corresponding image ID are shown in FIG. 3 in a terminal device 100 having the form factor of a base unit or frame. In this illustration, the terminal device 100 presents in the first call log entry a caller's name ("XXX Bank") with a call back number (800-555-6666) part of the caller ID retrieved in 204. This call log entry also presents a voicemail icon, a contact book icon, a call back icon, a memo icon and a delete icon, which provide the end user of the terminal device 100 several options to respond to the call log entry.

For example, the presentation of the voicemail icon indicates that the calling party has left a voicemail message. Upon selecting the voicemail icon, the terminal device 100 can be programmed to retrieve the voicemail message and playback said message by way of the audio system 110. The contact book icon can be selected by the end user of the terminal device 100 to present one or more entries in the contact book if desired. This selection may be useful if the end user wants to look at other phone numbers or ENUM identifiers associated with the calling party, or the end user needs to call another party first. By selecting the call back icon, the terminal device 100 can be programmed to return the call by initiating a call to the caller's number as shown. Selecting the memo icon generates a memo for recording text and/or audio notes or reminders associated with call log entry. If the end user has no use for the call log entry, the terminal device 100 can be directed to delete said call log entry in response to the end user making a selection of said icon.

As shown in FIG. 3, only the second and last entries show an image ID in the form of human figures. The first call log entry "XXX Bank" shows no image ID because the terminal device 100 determines in any one of steps 206, 216 and 226 that an image ID is not available. The same is true for the third and fourth call log entries. The second call log entry shows the caller's number and an image ID which for illustration purposes can represent a picture of a grandfather with his granddaughter. Hence, to the called party this image might identify the calling party as the end user's grandfather. Similarly, in the last entry an image ID can represent a picture of a mother and daughter. To the called party this image might identify the calling party as the end user's mother.

Figure 4:
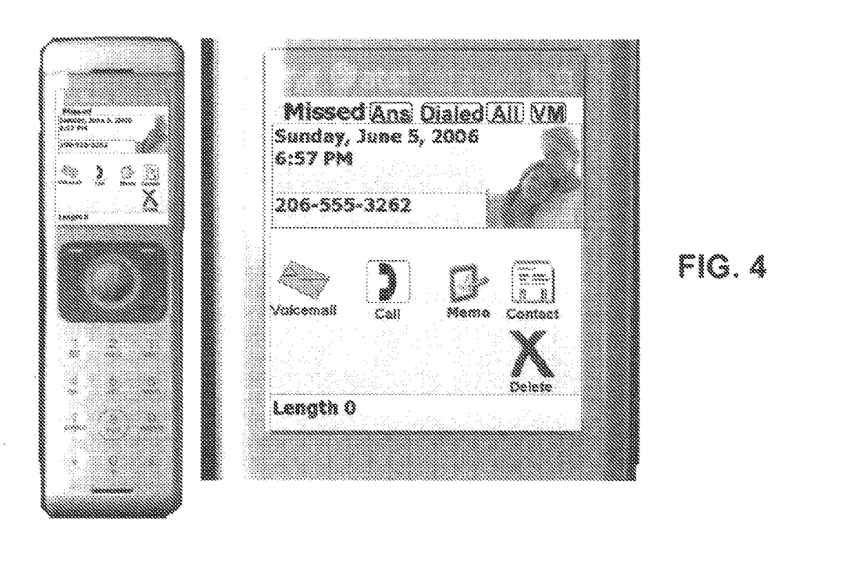

The lack of a voicemail icon in the second entry indicates that the grandfather did not leave a voicemail. The last entry shows a selectable voicemail icon which indicates the mother left a voicemail message. In either of the second and last call log entries with image IDs the end user can view the contact book, return the call, open and record a memo or delete the entry. FIG. 4 depicts a terminal device 100 having a form factor of a handset. In this illustration, the display 108 of the terminal device 100 is much smaller than the base unit of FIG. 3. Accordingly, only one entry is shown at a time. In this example, the image ID of the associated call log entry identifies an unanswered call from the called party's mother.

Referring back to step 232, the terminal device 100 can be programmed to monitor a selection by the end user of one of the call log icons discussed in FIGS. 3-4. If a selection is made, the terminal device 100 proceeds to step 234 where it initiates a specific action as described earlier for the iconic GUI elements.

The illustrations presented in FIGS. 3 and 4 represent call logs for missed calls in response to a selection by the end user of a "Missed" calls tab. Call logs for answered calls, dialed calls, callers who have left a voicemail, or all log entries can also be presented by the terminal device by selecting one among the "Missed", "Answered" ("Ans" for the handset), "Dialed", "All", and "Voicemail" ("VM" for the handset) tabs shown in FIGS. 3-4. Each of the entries in the Answered", "Dialed", "All", and "Voicemail" tabs also conforms to method 200 as described herein. That is, available image IDs are appended to dialed call entries, answered call entries and so on, to improve the called party's or calling party's ability to identify the recipient of the call log.

Method 200 thus provides a means to improve party identification in a communication transaction. By viewing image IDs for any of the aforementioned communication transactions, the end user of the terminal device 100 can readily associate a call log entry with a calling or called party without having to resort to memorizing phone numbers or ENUM identifiers. This is especially helpful when a caller ID of a calling party does not identify the calling party by name.

Upon reviewing the foregoing embodiments, it would be evident to an artisan with ordinary skill in the art that said embodiments can be modified, reduced, or enhanced without departing from the scope and spirit of the claims described below. Accordingly, the reader is directed to the claims section for a fuller understanding of the breadth and scope of the present disclosure.

Figure 5:
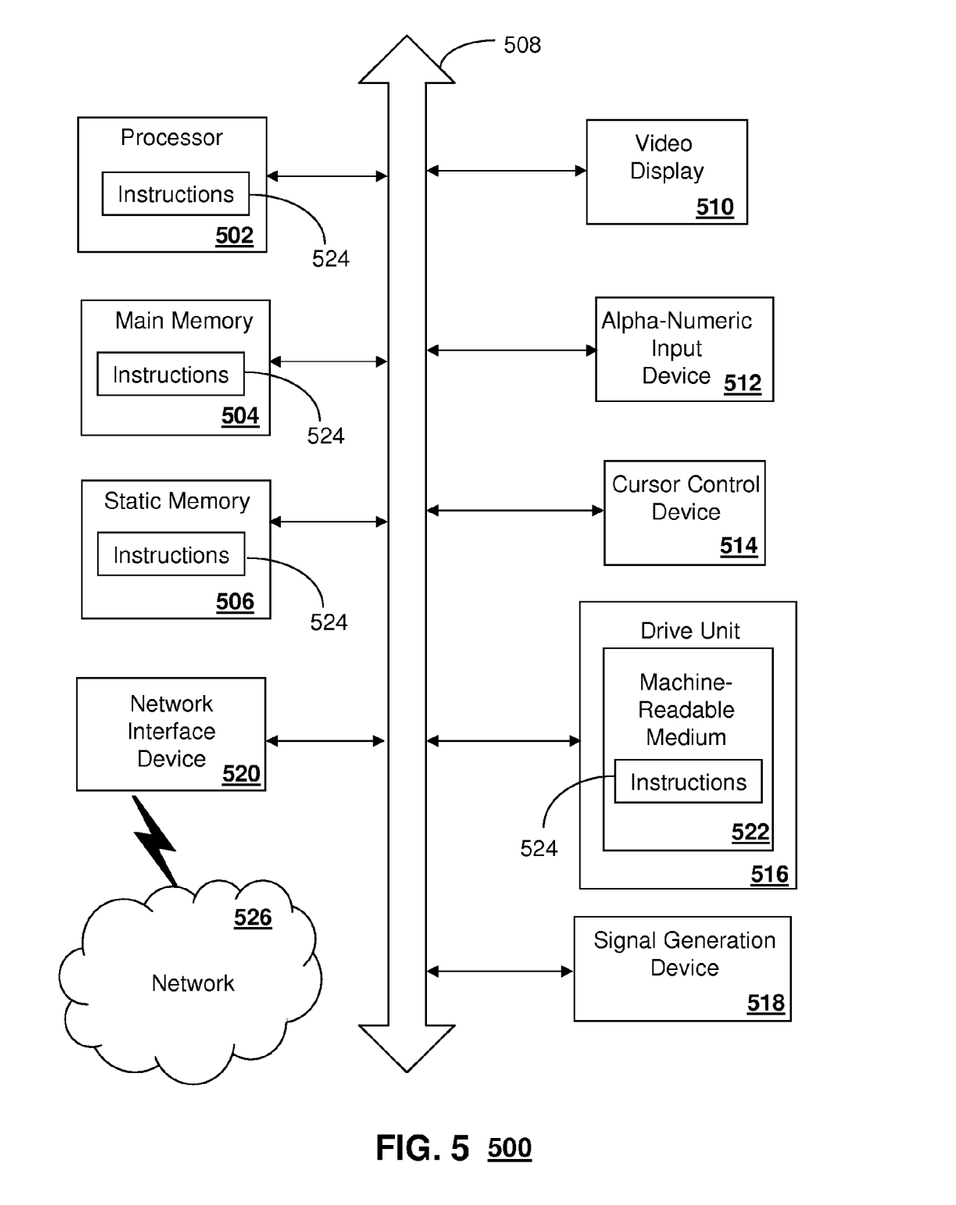
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium in a terminal device, the non-transitory computer-readable storage medium comprising computer instructions that, when executed by a processor, cause the processor to perform acts comprising:
   populating a call log with information related to a plurality of communications, wherein each of the communications is one of an answered incoming call, an unanswered incoming call, and an outgoing call, the information comprises an image identifier portraying a party involved in each of the communications and at least one of a phone number and a name of the party involved in each of the communications, and the image identifier portraying the party involved in at least one of the communications comprises a moving image; and
   presenting for display the call log populated with a respective entry for each respective communication of the plurality of communications, each respective entry including at least one of the phone number and the name of the party involved in the respective communication, along with the image identifier portraying the party involved in the respective communication and a graphical indication as to whether the respective communication is an answered incoming call, an unanswered incoming call, or an outgoing call.

2. The non-transitory storage medium of claim 1, wherein the communication is an unanswered incoming call and the storage medium further comprises computer instructions that, when executed by the processor, cause the processor to perform acts comprising:
   detecting a match between at least one of the phone number and the name of the party associated with the unanswered incoming call and an entry in a contact book; and
   retrieving the image identifier from the entry in the contact book.

3. The non-transitory storage medium of claim 1, wherein the communication is an outgoing call and the storage medium further comprises computer instructions that, when executed by the processor, cause the processor to perform acts comprising:
   detecting a match between at least one of the phone number and the name of the party associated with the party and an entry in a contact book; and
   retrieving the image identifier from the entry in the contact book.

4. The non-transitory storage medium of claim 1, wherein the image identifier portraying the party involved in at least one of the communications comprises a still image.

5. The non-transitory storage medium of claim 1, further comprising computer instructions that, when executed by the processor, cause the processor to perform acts comprising:
   presenting, as part of each respective entry within the call log, selectable graphical user interface (GUI) elements with the image identifier to interact with the respective entry in the call log.

6. The non-transitory storage medium of claim 5, wherein the selectable GUI elements comprise at least one of a contact book icon, a voicemail icon, a call back icon, a memo icon, and a delete icon.

7. The non-transitory storage medium of claim 6, further comprising computer instructions that, when executed by the processor, cause the processor to perform acts comprising:
   presenting at least one entry in a contact book in response to an end user of the terminal device selecting the contact book icon;
   retrieving a voicemail message in response to the end user selecting the voicemail icon;
   initiating a call to the party in response to the end user selecting the call back icon;
   generating a memo in response to the end user selecting the memo icon; and
   deleting the information related to the communication from the call log in response to the end user selecting the delete icon.

8. The non-transitory storage medium of claim 1, wherein the image identifier is received in the communication.

9. A terminal device, comprising:
a transceiver;
a display;
a processor in communication with the transceiver and the display; and
a non-transitory storage medium in communication with the processor, the non-transitory storage medium comprising instructions that, when executed by the processor, cause the processor to:
populate a call log with information related to a plurality of communications, wherein each communication is one of an answered incoming call, an unanswered incoming call, and an outgoing call, the information comprises an image identifier portraying a party involved in each of the communications and at least one of a phone number and a name of the party involved in each of the communications, and the image identifier portraying the party involved in at least one of the communications comprises a moving image; and
present via the display the call log populated with a respective entry for each respective communication of the plurality of communications, each respective entry including at least one of the phone number and the name of the party involved in the respective communication, along with the image identifier portraying the party involved in the respective communication and a graphical indication as to whether the respective communication is an answered incoming call, an unanswered incoming call, or an outgoing call.

10. The terminal device of claim 9, wherein the communication is an unanswered incoming call and the non-transitory storage medium further comprises instructions that, when executed by the processor, cause the processor to:
detect a match between at least one of the phone number and the name of the party associated with the unanswered incoming call and an entry in a contact book; and
retrieve the image identifier from the entry in the contact book.

11. The terminal device of claim 9, wherein the communication is an outgoing call and the non-transitory storage medium further comprises instructions that, when executed by the processor, cause the processor to:
detect a match between at least one of the phone number and the name of the party and an entry in a contact book; and
retrieve the image identifier from the entry in the contact book.

12. The terminal device of claim 9, wherein the non-transitory storage medium further comprises instructions that, when executed by the processor, cause the processor to:
present, as part of each respective entry within the call log, via the display selectable graphical user interface (GUI) elements with the image identifier to interact with the respective entry in the call log;
wherein the selectable GUI elements comprise at least one of a contact book icon, a voicemail icon, a call back icon, a memo icon, and a delete icon.

13. The terminal device of claim 12, wherein the non-transitory storage medium further comprises instructions that, when executed by the processor, cause the processor to:
present via the display at least one entry in a contact book in response to an end user of the terminal device selecting the contact book icon;
retrieve a voicemail message in response to the end user selecting the voicemail icon;
initiate a call to the party in response to the end user selecting the call back icon;
generate a memo in response to the end user selecting the memo icon; and
delete the information related to the communication from the call log in response to the end user selecting the delete icon.

14. The terminal device of claim 9, wherein the image identifier portraying the party involved in at least one of the communications comprises a still image.

15. A method, comprising:
populating a call log with information related to a plurality of communications, wherein each respective communication of the plurality of communications is one of an answered incoming call, an unanswered incoming call, and an outgoing call, the information comprises an image identifier portraying a party involved in each of the communications and at least one of a phone number and a name of the party involved in each of the communications, and the image identifier portraying the party involved in at least one of the communications comprises a moving image; and
presenting for display the call log populated with a respective entry for each respective communication of the plurality of communications, each respective entry including at least one of the phone number and the name of the party involved in the respective communication, along with the image identifier portraying the party involved in the respective communication and a graphical indication as to whether the respective communication is an answered incoming call, an unanswered incoming call, or an outgoing call.

16. The method of claim 15, wherein the image identifier portraying the party involved in at least one of the communications comprises a still image.

17. The method of claim 15, further comprising presenting, as part of each respective entry within the call log, selectable graphical user interface (GUI) elements with the image identifier to interact with the respective entry in the call log.

18. The method of claim 17, wherein the selectable GUI elements comprise at least one of a contact book icon, a voicemail icon, a call back icon, a memo icon, and a delete icon.

19. The method of claim 18, wherein the method further comprises:
presenting at least one entry in a contact book in response to an end user of the terminal device selecting the contact book icon;
retrieving a voicemail message in response to the end user selecting the voicemail icon;
initiating a call to the party in response to the end user selecting the call back icon;
generating a memo in response to the end user selecting the memo icon; and
deleting the information related to the communication from the call log in response to the end user selecting the delete icon.

20. The method of claim 15, wherein the communication is an unanswered incoming call and the method further comprises:
detecting a match between at least one of the phone number and the name of the party associated with the unanswered incoming call and an entry in a contact book; and
retrieving the image identifier from the entry in the contact book.

21. The method of claim 15, wherein the communication is an outgoing call and the method further comprises:
 detecting a match between at least one of the phone number and the name of the party associated with the party and an entry in a contact book; and
 retrieving the image identifier from the entry in the contact book.

22. The method of claim 15, further comprising receiving the image identifier in the communication.

23. The terminal device of claim 9, wherein the non-transitory storage medium further comprises instructions that, when executed by the processor, cause the processor to receive the image identifier in the communication.

* * * * *